United States Patent
Sato et al.

(10) Patent No.: US 8,094,133 B2
(45) Date of Patent: Jan. 10, 2012

(54) TOUCH PANEL DEVICE

(75) Inventors: Iwao Sato, Tokyo (JP); Seiichiro Mori, Tokyo (JP); Hiroyuki Murai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 12/556,253

(22) Filed: Sep. 9, 2009

(65) Prior Publication Data

US 2010/0066693 A1 Mar. 18, 2010

(30) Foreign Application Priority Data

Sep. 12, 2008 (JP) ................................. 2008-234298

(51) Int. Cl.
*G06F 3/041* (2006.01)
(52) U.S. Cl. .......................................... 345/173; 345/179
(58) Field of Classification Search ........................ None
See application file for complete search history.

(56) References Cited

U.S. PATENT DOCUMENTS

| | | | | |
|---|---|---|---|---|
| 5,528,002 A * | 6/1996 | Katabami | ................... | 178/19.06 |
| 5,790,106 A | 8/1998 | Hirano et al. | | |
| 5,798,756 A | 8/1998 | Yoshida et al. | | |
| 5,844,506 A | 12/1998 | Binstead | | |
| 6,137,427 A * | 10/2000 | Binstead | .......................... | 341/33 |
| 6,239,788 B1 | 5/2001 | Nohno et al. | | |
| 6,633,280 B1 * | 10/2003 | Matsumoto et al. | .......... | 345/173 |
| 2001/0055005 A1 * | 12/2001 | Teterwak | ...................... | 345/173 |

FOREIGN PATENT DOCUMENTS

| | | |
|---|---|---|
| JP | 8-95701 | 4/1996 |
| JP | 8-137607 | 5/1996 |
| JP | 8-147092 | 6/1996 |
| JP | 8-179887 | 7/1996 |
| JP | 9-511086 | 11/1997 |
| JP | 11-305932 | 11/1999 |

* cited by examiner

*Primary Examiner* — Paul Huber
(74) *Attorney, Agent, or Firm* — Oblon, Spivak, McClelland, Maier & Neustadt, L.L.P.

(57) ABSTRACT

A touch panel device according to the present invention includes: a stylus pen including a conductive stylus pen electrode portion at a tip portion thereof; a plurality of capacitance detecting interconnections formed on a substrate in row and column directions; an oscillator circuit which outputs an oscillation signal for performing charging/discharging to each of the plurality of capacitance detecting interconnections, the oscillation signal having a cycle which changes in accordance with an amount of electric charges in the charging/discharging; and a counter circuit and a computing circuit/control circuit which compute, based on a change of the cycle being in accordance with a capacitance formed between the electrode portion of the stylus pen and the capacitance detecting interconnections, positional coordinates of the stylus pen brought in proximity to the capacitance detecting interconnections in a non-contact manner, wherein the stylus pen outputs to the electrode portion of the stylus pen an input pen signal which is in synchronization with the oscillation signal, has a phase different from a phase of the oscillation signal, and has a larger voltage amplitude compared with the oscillation signal.

5 Claims, 6 Drawing Sheets

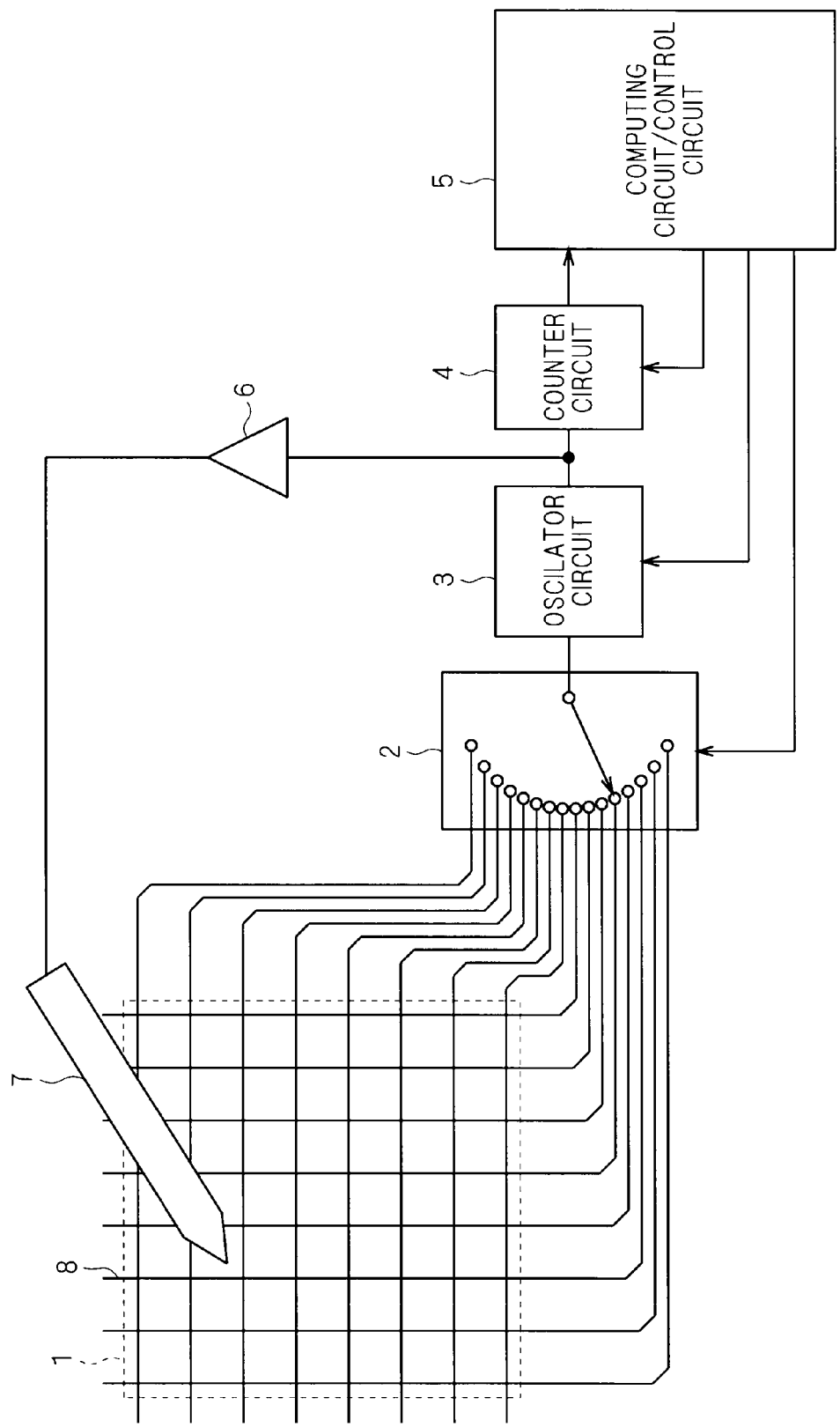
F I G. 1

TOUCH PANEL DEVICE

BACKGROUND OF THE INVENTION

1. Field of the Invention

The present invention relates to a touch panel device including an input pen.

2. Description of the Background Art

In order to detect an input position on a touch panel, there are provided various types of touch panels, such as resistive touch panels, infrared scan touch panels, surface acoustic wave touch panels, acoustic pulse recognition touch panels, touch panels with infrared image sensor and capacitive touch panels. Of those, the capacitive touch panels are classified into a projected capacitive touch screen (hereinafter, referred to as PCT) and a surface capacitive touch screen, in which an input position of a finger is detected by detecting a capacitance change between the finger of an operator and a touch panel detection electrode wire.

In the PCT, it is possible to detect touch even when a front surface side of a touch screen containing a touch sensor is covered with a protective plate such as a glass plate whose thickness is approximately several mm. The PCT has advantages in that a touch screen has excellent toughness, that touch detection is enabled even by a gloved finger, and that the touch panel has long life because a movable part is not provided.

There are various ways of detecting touch capacitance of a touch panel of the PCT, and for example, there is a touch panel using a self-exciting oscillator circuit as described in National Publication of Translation No. 09-511086 (1997).

The touch screen described in National Publication of Translation No. 09-511086 (1997) is configured to include, as detection conductors for detecting capacitance, a first series of conducting material pattern (conductor elements) formed as a thin dielectric film and a second series of conducting material pattern formed through separating an insulating film, have no electrical contact between the conductors, and include a plurality of intersections formed therebetween. In addition, as shown in FIG. 8 of National Publication of Translation No. 09-511086 (1997), the conductor elements which detect capacitance are connected to an oscillator 85 via a multiplexer 75 and an output line 72. An oscillating frequency of the oscillator 85 changes in accordance with parasitic capacitance of the conductor element and the touch capacitance formed by the conductor element and the finger, and outputs thereof are counted by a divide-by-n circuit 90 to be made capacitance detection data.

Further, Japanese Patent Application Laid-Open No. 08-137607 (1996), Japanese Patent Application Laid-Open No. 08-147092 (1996) and Japanese Patent Application Laid-Open No. 08-95701 (1996) disclose devices which perform finger input and pen input by switching input detection. Japanese Patent Application Laid-Open No. 08-179887 (1996) and Japanese Patent Application Laid-Open No. 11-305932 (1999) disclose input detection devices which are integrated with liquid crystal display (LCD) and simultaneously perform display and input.

However, for performing input to the touch panel of the PCT as disclosed in Japanese National Publication of Translation No. 09-511086 (1997), the operator needs to touch the touch screen with a finger. The input with a finger has advantages of, for example, high operability and simplicity, as well as high safety because the touch screen does not respond to objects other than a finger. On the other hand, an area of the finger per se is larger compared with a pen's tip, and hence it is difficult to press a small area or input a character by inputting with a finger. Therefore, it is impossible to input a position with high definition by inputting with a finger.

A contact area of the finger tip differs depending on age, sex, body size and a manner of touching the touch screen, but it is approximately 100 mm$^2$. An electrode touched with the finger and the detection electrode interpose protective glass or the like therebetween. Therefore, the capacitance formed between the electrode touched with the finger and the detection electrode differs depending on a structure of the touch screen, and it is generally several picofarad (approximately from 2 pF to 5 pF). In order to input a position with high definition, suppose that stylus pen with a conductivity electrode which is much smaller than an area of a finger tip at the pen tip and is electrically connected to a human body is prepared temporarily. Then, even when the stylus pen touches a touch screen, the capacitance formed by the touch screen and the pen tip electrode is considerably small in proportion to an area of the touched electrode, and hence it is extremely difficult to detect a position thereof.

Here, it is assumed that a dielectric constant is $\in 0$, a relative dielectric constant of a material (protective glass) located between the detection electrode and the touch surface is $\in s$, a finger touch area is St, a stylus pen contact area is Ss, and a distance (gap) between the detection electrode and an electrode for forming a capacitance at an input position is d. Then, in each case, where the touch screen is touched with a finger and where the touch screen is touched with the stylus pen, the capacitance formed between the touched electrode and the detection electrode are represented as follows when calculated under a simplification by using a plate capacitor model.

Case where the touch screen is touched with a finger:
$Ct = (\in 0 \times \in s \times St) \div d$ Case where the touch screen is touched with a stylus pen:
$Cs = (\in 0 \times \in s \times Ss) \div d = Ct \times (Ss \div St)$ The dielectric constant $\in 0$, the relative dielectric constant $\in s$ and the distance d are the same in the two equations, and the capacitance are proportional to an electrode area of an input device such as a finger or a pen tip. Therefore, it is extremely difficult to perform position detection with the stylus pen having a small contact area.

Further, it is possible to realize position detection by combining with the input detection system which enables stylus pen input as disclosed in Japanese Patent Application Laid-Open No. 08-137607 (1996), Japanese Patent Application Laid-Open No. 08-147092 (1996) and Japanese Patent Application Laid-Open No. 08-95701 (1996). However, in such position detection, there arise problems of an increase in cost for modifying structure of the touch panel, quality degradation in LCD display due to a decrease in transmittance, and degradation in operability and simplicity. For example, since the input system is used in combination, there is required a switching circuit for selecting a detection function in advance. The methods disclosed in Japanese Patent Application Laid-Open No. 08-179887 (1996) and Japanese Patent Application Laid-Open No. 11-305932 (1999) are not particularly aimed to improve position detection with a stylus pen.

SUMMARY OF THE INVENTION

An object of the present invention is to enable, in a capacitive touch panel in which a capacitance detection circuit is formed of a self-exciting oscillator circuit, both finger input and stylus pen input with an inexpensive configuration.

A touch panel device according to the present invention includes an input pen, a plurality of capacitance detecting interconnections, an oscillating section and a computing section.

The input pen includes a conductive electrode at a tip portion thereof. The plurality of capacitance detecting interconnections are formed on a substrate in row and column directions. The oscillating section outputs an oscillation signal for performing charging/discharging to each of the plurality of capacitance detecting interconnections. The oscillation signal has a cycle which changes in accordance with an amount of electric charges to be charged/discharged. The computing section computes positional coordinates of the input pen brought in proximity to the capacitance detecting interconnections in a non-contact manner. The computation is performed based on a change of the cycle which is in accordance with a capacitance formed between the electrode and the capacitance detecting interconnections. The input pen outputs an input pen signal to the electrode. The input pen signal is in synchronization with the oscillation signal, has a phase different from that of the oscillation signal and has a larger amplitude of voltage compared with the oscillation signal.

Owing to the output of the input pen signal, charging/discharging of electric charge amount equal to that of the finger input are performed on the capacitance detecting interconnections. Accordingly, it is possible to perform high-definition input with the input pen while maintaining operability and simplicity of finger input without changing a structure of the touch panel and impairing display quality of liquid crystal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a configuration diagram of a touch panel device according to the present invention;

DESCRIPTION OF THE PREFERRED EMBODIMENT

Figure 2:
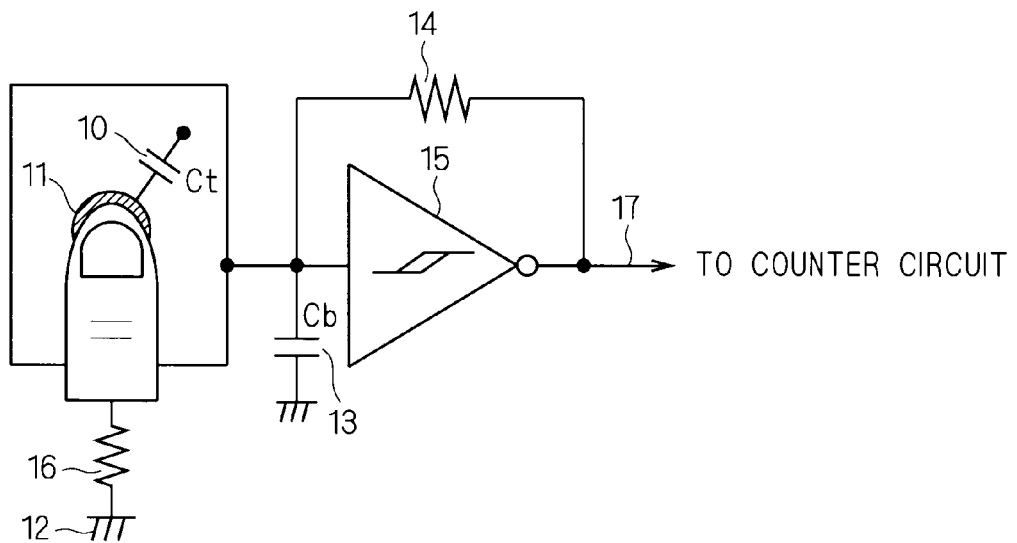
FIG. 2 is a diagram showing a detection circuit when finger input is performed.

Hereinafter, the present invention will be specifically described with reference to the drawings by way of an embodiment.

(Configuration)

FIG. 1 is a configuration diagram of a touch panel device thereof according to the present invention, which includes a stylus pen (input pen) 7 including a conductive electrode at a tip portion. The configuration thereof will be described below.

In a touch screen 1, a plurality of capacitance detecting interconnections 8 which are formed on a substrate in row and column directions are provided, and the capacitance detecting interconnections 8 are individually connected to a plurality of output sections of an interconnection selector circuit 2. An input section of the interconnection selector circuit 2 is connected to an output section of an oscillator circuit (oscillating section) 3, and an input section of the oscillator circuit 3 is connected to an output section of a counter circuit 4. In addition, the output section of the counter circuit 4 is connected to an input section of a buffer 6, and an output section of the buffer 6 is connected to the stylus pen 7. The oscillator circuit 3 outputs an oscillation signal for performing charging/discharging to each of the plurality of capacitance detecting interconnections. As described below, a cycle of the oscillation signal changes in accordance with an amount of electric charges to be charged and discharged.

An input section of a computing circuit/control circuit 5 is connected to the output section of the counter circuit 4, and an output section of the computing circuit/control circuit 5 is connected to the input sections of the interconnection selector circuit 2 and the oscillator circuit 3, and an input section of the counter circuit 4. The counter circuit 4 and the computing circuit/control circuit 5 have a function as a computing section which computes, based on a change of a cycle of the oscillation signal in accordance with forming capacitance between the electrode of the stylus pen 7 and the capacitance detecting interconnection 8, positional coordinates of the stylus pen 7 which is brought in proximity to the capacitance detecting interconnections 8 in a non-contact manner.

FIG. 2 shows a case where the touch screen 1 is touched with a finger in a detection circuit for a touch panel, in which a hysteresis comparator 15 is applied to the oscillator circuit. Reference numeral 11 denotes a finger touch area St at a touch electrode, and there is formed a capacitance Ct10 between the touch electrode and the detecting interconnection, which is a capacitance between the touch electrode and the capacitance detecting interconnection 8. In addition, the finger is connected to a grounding point 12 via a resistor 16 between a human body and the ground when the finger touch is made.

The capacitance detecting interconnection 8 is connected to an input section of the hysteresis comparator 15, and an output section of the hysteresis comparator 15 is connected to the counter circuit 4. In addition, a charging/discharging resistor 14 is connected between the input section and the output section of the hysteresis comparator 15, and the input section of the hysteresis comparator 15 is grounded via a touch panel detecting interconnection capacitance Cb13.

The hysteresis comparator 15 is equivalent to the oscillator circuit 3 of FIG. 1, and the charging/discharging resistor 14 and the touch panel detecting interconnection capacitance Cb13 are equivalent to a resistor and a capacitance of the capacitance detecting interconnection 8 when the touch screen is not touched.

Figure 4:
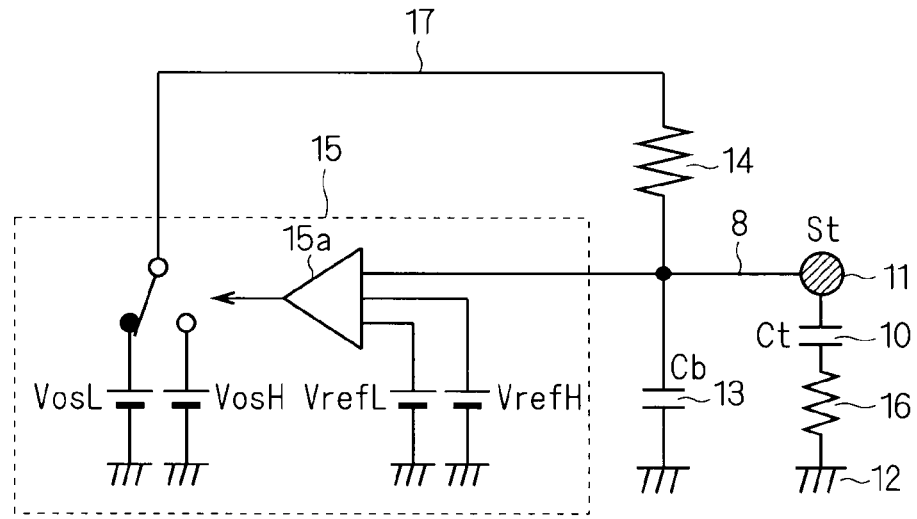
FIG. 4 is a diagram showing the detection circuit when stylus pen input is performed.

For simplicity of the description, in particular, the hysteresis comparator 15 of FIG. 2 is further modeled in FIG. 4. The hysteresis comparator 15 includes a comparator 15a, and an input section of the comparator 15a receives a first threshold voltage VrefH and a second threshold voltage VrefL in addition to an input signal of the capacitance detecting interconnection 8.

An output section of the comparator 15a is configured to select and output one of a potential VosL and a potential VosH. The output section outputs the potential VosH when the input signal from the capacitance detecting interconnection 8 is smaller than the second threshold voltage VrefL, and outputs the potential VosL when the input signal is larger than the first threshold voltage VrefH.

Figure 3:
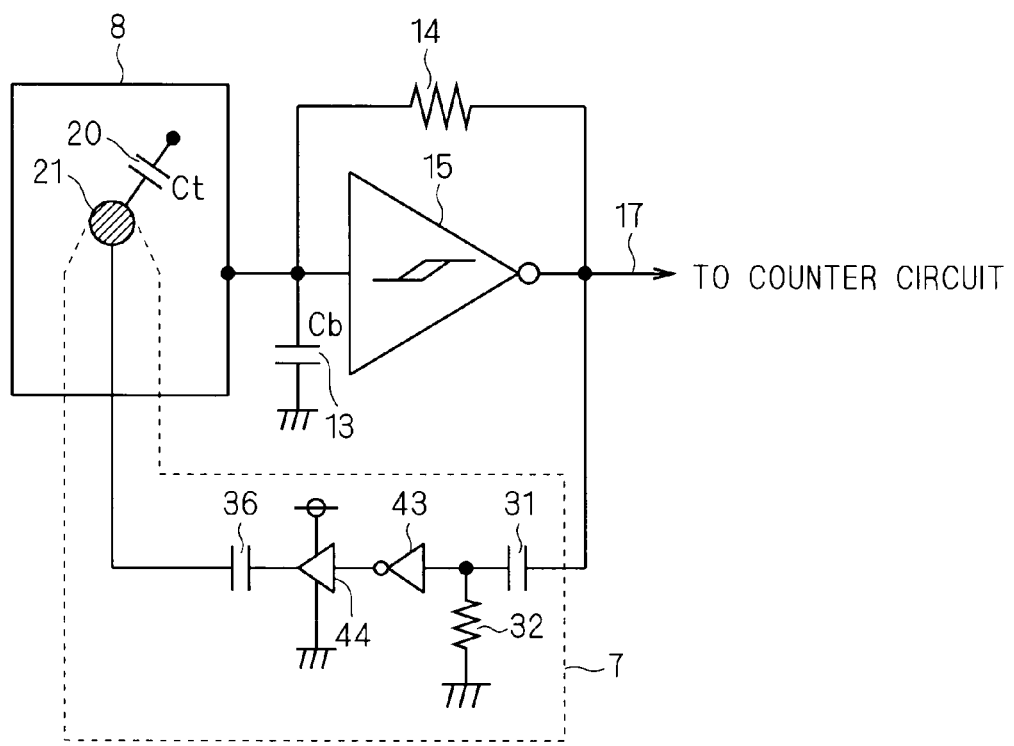
FIG. 3 is another diagram showing the detection circuit when the finger input is performed.

FIG. 3 shows a case where the touch screen is touched with the stylus pen 7 in a detection circuit for a touch panel, in which the hysteresis comparator 15 is applied to the capacitance detection circuit. The stylus pen 7 is connected to the output section of the hysteresis comparator 15, and is connected to one end of a DC cut capacitor 31. The other end of the DC cut capacitor 31 is grounded via a bias fixing resistor 32 and is also connected to an input section of a phase inversion inverter 43. An output section of the phase inversion inverter 43 is connected to an input section of a voltage conversion level shifter 44, and an output section of the voltage conversion level shifter 44 is connected to one end of a DC cut capacitor 36. The other end of the DC cut capacitor 36 is connected to a stylus pen electrode portion 21. The stylus pen electrode portion 21 forms a capacitance Cs20 between the stylus pen and the detecting interconnection which is a capacitance between the capacitance detecting interconnection 8 and the stylus pen electrode portion 21.

The hysteresis comparator 15 is equivalent to the oscillator circuit 3 of FIG. 1, and the charging/discharging resistor 14 and the touch panel detecting interconnection capacitance Cb13 are equivalent to the resistor and the capacitance of the capacitance detecting interconnection 8 when the touch screen is not touched.

Figure 5:
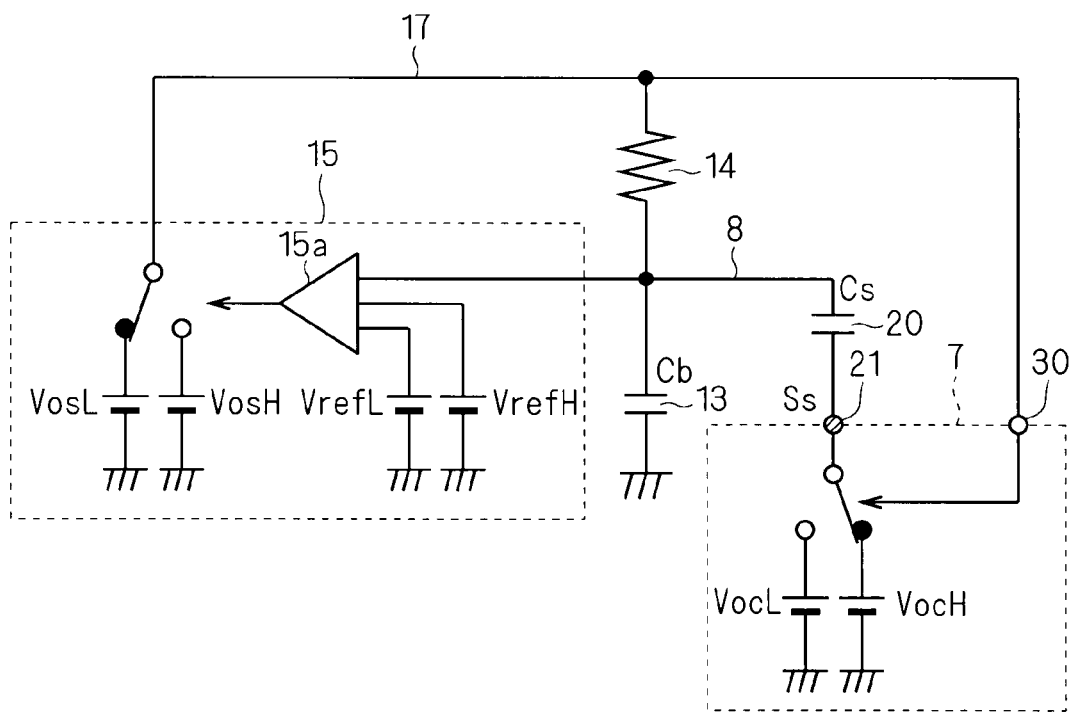
FIG. 5 is another diagram showing the detection circuit when the stylus pen input is performed.

For simplicity of the description, the hysteresis comparator 15 and the stylus pen 7 of FIG. 3 are further modeled in FIG. 5. An inside of the hysteresis comparator 15 is similar to that of FIG. 4, and thus detailed description thereof is omitted here. The stylus pen 7 is configured to select and output one of the potential VocL and the potential VocH. The stylus pen 7 outputs the potential VocH when the input signal input from the hysteresis comparator 15 is VosL, and outputs the potential VocL when an input signal input therefrom is VosH.

(Operation)

Next, an operation of the touch panel device according to the present invention will be described.

The hysteresis comparator 15 shown in FIG. 2 and FIG. 3 operates so as to discharge the capacitance (output the potential VosL) from its output section in a case where the input voltage is larger than the first threshold voltage VrefH. Here, the capacitance is formed between a detection line connected to the output section of the comparator 15 through a resistor or a constant current circuit and an electrode located in the vicinity thereof. In contrast, the hysteresis comparator 15 operates so as to charge the capacitance (output the potential VosH) in a case where the input voltage is smaller than the second threshold voltage VrefL. In this case, assuming that the capacitance formed between the detection line connected to the oscillator circuit and the electrode located in the vicinity thereof is Cb, an electric charge amount Qb which is an amount of electric charges moved by an oscillation operation for one charging or one discharging when the touch screen is not touched, is as follows:

$$Qb = Cb \times (VrefH - VrefL) \quad (1)$$

In addition, an electric charge amount Qt for one charging or one discharging, in which the electric charges are moved to or from capacitance Ct10 between the touch electrode and detecting interconnection after charging is performed from the potential VrefL to the potential VrefH immediately after finger touch is performed, is as follows:

$$Qt = Ct \times (VrefH - VrefL) \quad (2)$$

Accordingly, an electric charge amount Q for one charging or one discharging, in which the electric charges are moved by the oscillation operation when finger touch is performed, is as follows:

$$Q = Qb + Qt$$

The electric charge amount Q is increased by the electric charge amount Qt by finger touch, and then the oscillation frequency fluctuates, whereby the finger touch is detected.

Here, even in a case of a pen tip electrode (having an area Ss) of the stylus pen, which is smaller than the contact area St of a finger, if a similar degree of electric charge amount to the electric charge amount Qt in which the electric charges are moved by finger touch is moved, detection is enabled with the stylus pen as in the case of finger touch, without changing a detection circuit configuration of the touch panel.

As described above, the pen tip contact area Ss of the stylus pen 7 is smaller than the contact area St of the finger, and thus the capacitance Cs20 between the stylus pen and the detecting interconnection is much smaller than the capacitance Ct10 between the touch electrode and the detection interconnection. Therefore, it is preferable that the pen tip electrode of the stylus pen 7 is not grounded but is applied with an alternating current signal which has a voltage amplitude to make the electric charge amount Qs for charging/discharging a capacitance Cs by the oscillator circuit equivalent to the electric charge amount Qt by finger touch.

Specifically, an alternating current signal which is in synchronization with an oscillation waveform of the oscillator circuit 3 forming the detection circuit of the touch panel and has a phase different from that of the oscillation waveform is subjected to voltage amplification and is applied to the pen tip electrode of the stylus pen 7 so that the voltage for charging/discharging the capacitance Cs 20 between the stylus pen and the detecting interconnection is as follows:

$$(VrefH - VrefL) \times (St/Ss) \quad (3)$$

Accordingly, an amount of the moved electric charges is equivalent to the electric charge amount Qt, whereby it is possible to input a position with the stylus pen 7. That is, the stylus pen 7 outputs, to the electrode, the input pen signal which is in synchronization with the oscillation signal of the oscillator circuit 3, has the phase different from that of the oscillation signal, and has a larger amplitude of voltage compared with the oscillation signal.

For example, when it is assumed that the contact area of the finger is 100 mm$^2$ and the contact area of the stylus pen is 4 mm$^2$, the contact area ratio therebetween is 25:1. When the voltage (VrefH−VrefL) of the oscillator circuit is assumed to be 1 V, the electric charge amount in which the electric charges are moved by the oscillation operation is equal to the electric charge amount when the contact is made with a finger even in a case where the stylus pen 7 is used, if the voltage amplitude at a contact point of the pen tip electrode of the stylus pen is adjusted so that the voltage for charging/discharging the capacitance Cs is made to be 25 V (1 V×25 times). As a result, it is possible to obtain input sensitivity equal to that in the case when the finger touch is made.

Figure 6:
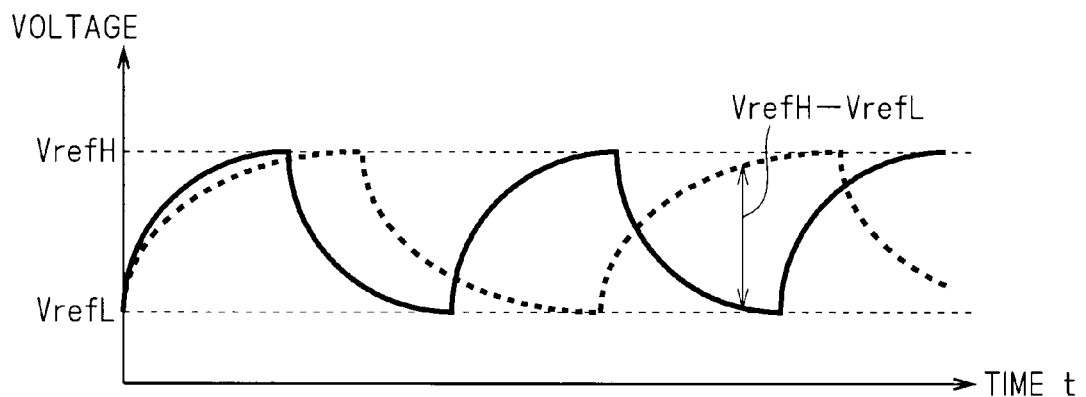
FIG. 6 shows an input waveform of a hysteresis comparator.
Figure 7:
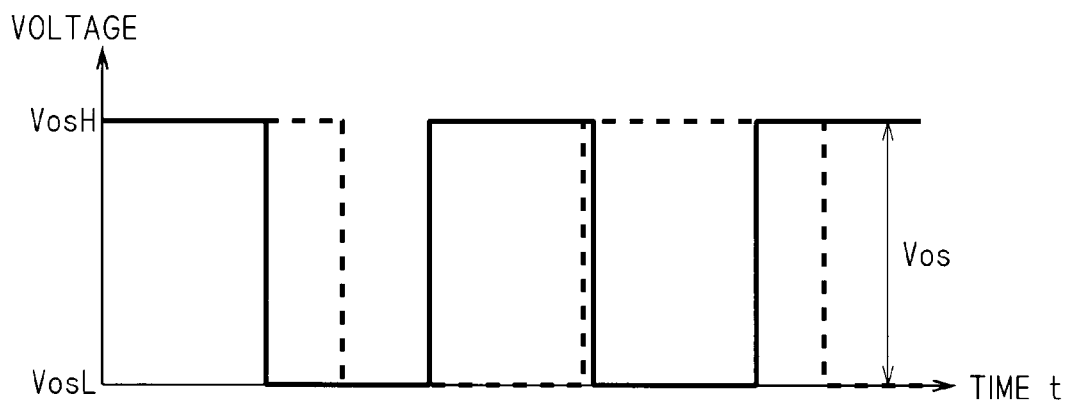
FIG. 7 shows an output waveform of the hysteresis comparator.
Figure 8:
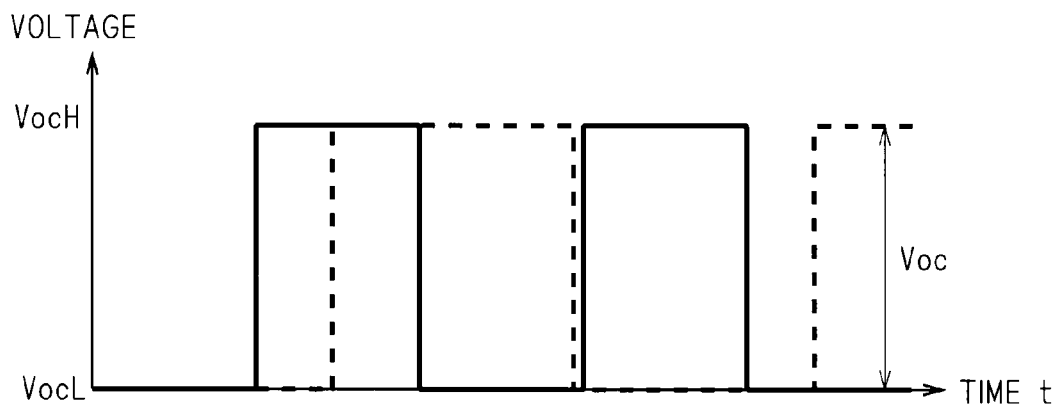
FIG. 8 shows another output waveform of the hysteresis comparator.

In FIG. 2, when the operator touches the touch screen with the finger, charging/discharging of the capacitance Ct10 between the finger touch electrode and the detecting interconnection are performed via the charging/discharging resistor 14. FIG. 6 shows a waveform when charging/discharging are performed between the finger touch electrode 11 and the capacitance detecting interconnection 8, which is input to the hysteresis comparator. FIG. 7 shows a waveform at the hysteresis comparator output section 17. Solid lines and dotted lines of FIG. 7 and FIG. 8 indicate waveforms of a normal operation when touch is not made (input is not performed) and waveforms in the case where the touch panel is touched by a finger, respectively. FIG. 7 and FIG. 8 reveal that, by finger touch, the capacitance is increased and the cycle of the clock signal output from the hysteresis comparator 15 is made longer. The cycle of the clock signal is counted, and a computing based on detection results of the respective capacitance detecting interconnections 8 is performed, to thereby output the input positional coordinates.

In the case where input is performed with the stylus pen 7 in the present invention, as described above, the capacitance Cs20 between the stylus pen and the detecting interconnection is extremely small compared with the case where the touch screen is touched with a finger. Accordingly, in order to obtain the electric charge amount equal to that in the case where the touch screen is touched with a finger, it is required to apply the stylus pen electrode portion 21 with an alternating current signal which inverts a phase of the signal of the hysteresis comparator output section 17 shown in FIG. 3 by 180 degrees using an inverter circuit or the like contained in the stylus pen 7, and amplify the voltage of the alternating current by the voltage amplifier circuit, to thereby make the voltage for charging/discharging the capacitance Cs a voltage $(VrefH-VrefL) \times (St/Ss)$.

Figure 9:
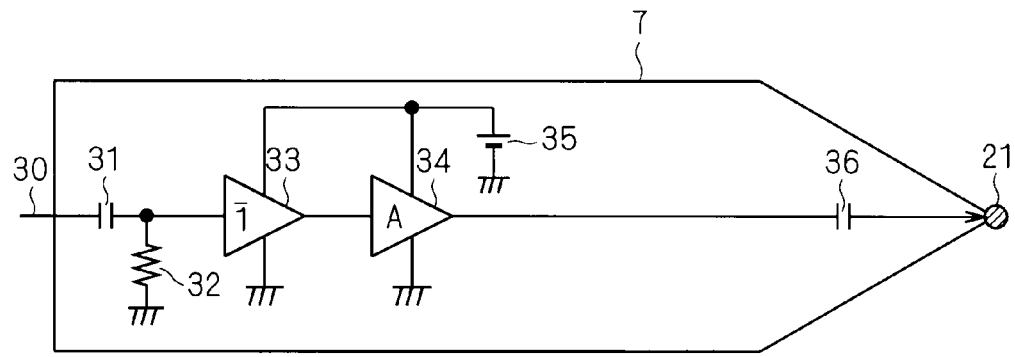
FIG. 9 is a diagram showing a configuration example of a stylus pen.

As a method therefor, FIG. 9 shows an embodiment of a stylus pen containing a phase inversion amplifier. Reference numeral 30 denotes a stylus pen synchronization signal input terminal for synchronization with the detection circuit, which is connected to the one end of the DC cut capacitor 31. The other end of the DC cut capacitor 31 is grounded via the bias fixing resistor 32 and is also connected to an input section of a phase inversion amplifier 33. An output section of the phase inversion amplifier 33 is connected to an input section of an amplification amplifier 34, and an output section of the amplification amplifier 34 is connected to one end of a DC cut capacitor 36. The other end of the DC cut capacitor 36 is connected to the stylus pen electrode portion 21. Reference numeral 35 denotes a stylus high voltage power supply.

A signal of the hysteresis comparator output section 17 is input from the stylus pen synchronization signal input terminal 30 in a wired manner (or wireless manner) for synchronization with the charging/discharging cycle of the detection circuit, and then the signal is converted by the phase inversion amplifier 33 and the amplification amplifier 34, with the result that the alternating current signal to be applied to the grounding point is output via the stylus pen electrode portion 21.

Here, as described above, assuming that the contact area when the touch screen is touched with a finger is 100 mm$^2$ and the contact area when the touch screen is touched with the stylus pen 7 is 4 mm$^2$, in order to obtain the electric charge amount equal to that when the touch screen is touched with a finger, it is required to supply, to the grounding point of the stylus electrode, the alternating current signal in which the phase of the oscillation waveform of the detection circuit is inverted so that the voltage for charging/discharging the capacitance Cs is 25 times (in contact area ratio) a value VrefH−VrefL. In the circuit example shown in FIG. 5, the oscillation waveform of the detection circuit of the touch panel is caused to have a phase inverted by 180 degrees by the phase inversion amplifier 33, and a voltage converted by the amplification amplifier 34 so as to have an A-times degree of amplitude is supplied to the stylus pen electrode portion 21.

That is, the phase of the signal provided to the stylus pen 7 is different from that of the oscillation signal of the detection circuit by 180 degrees, and the amplitude of the signal input to the stylus pen 7 is set so that the electric charge amount of the capacitance Cs is equal to the electric charge amount in which the electric charges are charged/discharged when finger input is performed.

As a result, even in a case where the capacitive touch panel is touched with the stylus pen, it is possible to perform input equal to that in the case where the capacitive touch panel is touched with the finger. Accordingly, it is possible to maintain operability and simplicity without changing the structure of the touch panel.

As to an output signal of the detection circuit, signal transmission from the hysteresis comparator output section 17 to the stylus pen synchronization signal input terminal 30 can be realized through wired connection using a copper wire or the like for the sake of convenience because a direct current component is not required to be transmitted but only an alternating current component needs to be transmitted. Alternatively, considering inconvenience when operating the stylus pen 7 or convenience when carrying the stylus pen 7, it is possible to form a transmitting circuit and a receiving circuit on the touch panel side and the stylus pen side, respectively, to thereby obtain wireless connection. On that occasion, it is possible to provide the phase inversion amplifier 33 with a degree of amplification when a received signal level is small.

Figure 10:
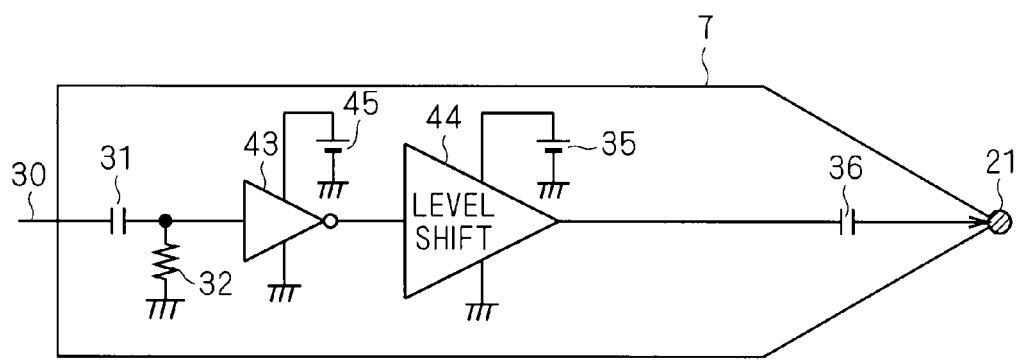
FIG. 10 is another diagram showing the configuration example of the stylus pen.

FIG. 10 shows an embodiment in a case where an alternating current signal generation circuit of the stylus pen 7 is formed of an inverter and a level shifter circuit. The configuration thereof is similar to that of the stylus pen 7 shown in FIG. 4, and thus detailed description thereof is omitted here. A voltage conversion level shifter 44 can be formed of an analog switch IC or the like without difficulty and also is a logic circuit, and accordingly is more advantageous in electrical power consumption than the circuit of FIG. 9.

(Effect)

In the capacitive touch panel in which the oscillation signal output from the oscillator circuit 3 is used by a capacitance detection unit, the input pen signal which is in synchronization with the oscillation signal, has a phase different from that of the oscillation signal and has a larger amplitude of voltage compared with the oscillation signal is output to the electrode at the tip portion of the stylus pen 7. As a result, charging/discharging of the electric charge amount equal to that of the finger input can be performed on the capacitance detecting interconnection 8 even when an area of the stylus pen electrode portion 21 is small. In addition, the oscillator circuit 3, the counter circuit 4 and the computing circuit/control circuit 5 can be used, without changing the structure of the touch panel, in common when finger input is performed and when the stylus pen is used. Accordingly, it is possible to provide a capacitive touch panel device which enables high-definition input with the stylus pen 7 while maintaining operability and simplicity of finger input without impairing display quality of liquid crystal.

Note that a detecting interconnection pitch of the capacitance detecting interconnections 8 of the touch screen which is aimed for finger input is formed with a view to a finger in many cases, and is approximately 5 mm to 10 mm. Accordingly, when the area of the stylus pen electrode portion 21 is small, only one of the capacitance detecting interconnections 8 can be affected.

In a case where position interpolation is performed between pitches of the capacitance detecting interconnections 8 to increase positional accuracy further, a plurality of capacitance detecting interconnections 8 need to be affected.

Similarly in the stylus pen 7, the pen tip electrode which affects the plurality of capacitance detecting interconnections 8 is desirably conical in shape, in which a diameter of the pen tip is increased as much as possible in addition to increasing the contact area as much as possible.

Figure 11:
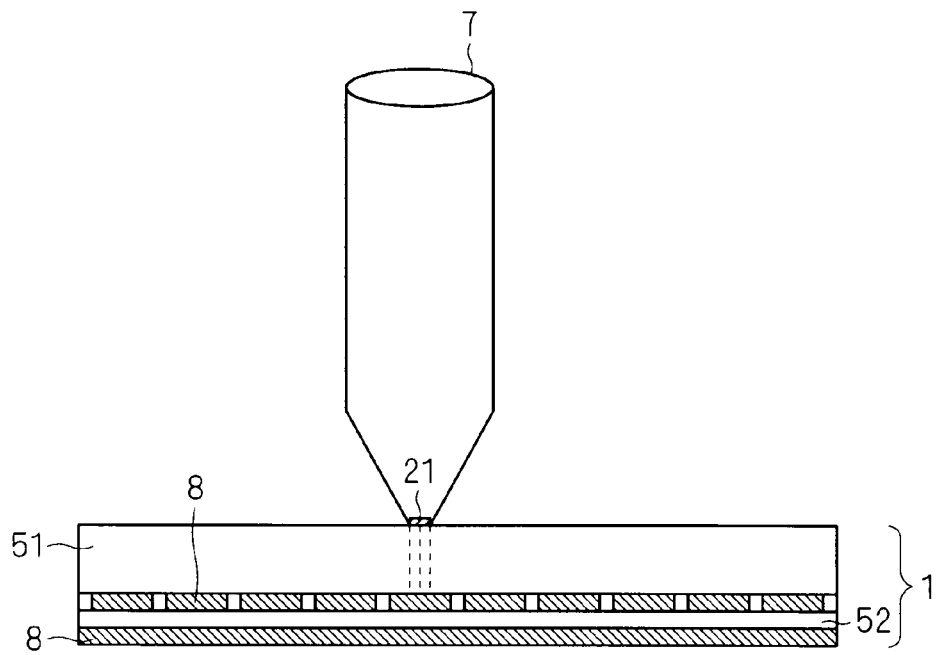
FIG. 11 is a diagram showing an example of a pen tip shape of the stylus pen.
Figure 12:
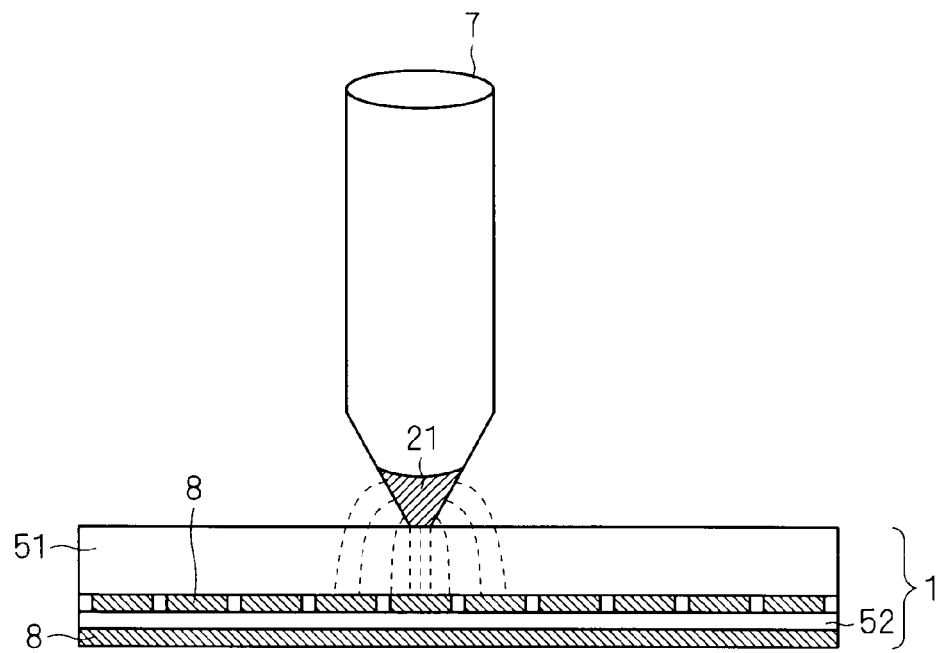
FIG. 12 is another diagram showing the example of the pen tip shape of the stylus pen.

FIG. 11 and FIG. 12 show shape examples of the stylus pen electrode portion 21 in the touch screen 1 and the stylus pen 7. In the touch screen 1, reference numerals 51, 52 and 8 denote a protective film, an insulating layer and a plurality of capacitance detecting interconnections formed in row and column directions, respectively.

FIG. 11 shows the example in which the area of the stylus pen tip is small, and FIG. 12 shows the example in which the pen tip is conical in shape. In the example of FIG. 11, only one of the capacitance detecting interconnections 8 is affected, whereas in the example of FIG. 12, the plurality of capacitance detecting interconnections 8 can be affected because the pen tip electrode is conical in shape with a pen tip being as a vertex.

While the invention has been shown and described in detail, the foregoing description is in all aspects illustrative and not restrictive. It is therefore understood that numerous modifications and variations can be devised without departing from the scope of the invention.

What is claimed is:

1. A touch panel device, comprising:
    an input pen including a conductive electrode at a tip portion thereof;
    a plurality of capacitance detecting interconnections formed on a substrate in row and column directions;
    an oscillating section which outputs an oscillation signal for performing charging/discharging to each of said plurality of capacitance detecting interconnections, said oscillation signal having a cycle which changes in accordance with an amount of electric charges in said charging/discharging; and
    a computing section which computes, based on a change of said cycle being in accordance with a capacitance formed between said electrode and said capacitance detecting interconnections, positional coordinates of said input pen brought in proximity to said capacitance detecting interconnections in a non-contact manner,
    wherein said input pen outputs to said electrode an input pen signal which is in synchronization with said oscillation signal, has a phase different from a phase of said oscillation signal, and has a larger voltage amplitude compared with said oscillation signal.

2. The touch panel device according to claim 1, wherein a phase of said input pen signal is different from a phase of said oscillation signal by 180 degrees.

3. The touch panel device according to claim 1, wherein an amplitude of voltage of said input pen signal is set so that an amount of electric charges to be charged/discharged when the input pen is used is equal to an amount of electric charges to be charged/discharged when finger input is performed.

4. The touch panel device according to claim 1, wherein said oscillating section and said computing section are used in common when a finger input is performed and when said input pen is used.

5. The touch panel device according to claim 1, wherein said electrode of said input pen is conical in shape with a pen tip being as a vertex.

* * * * *